United States Patent Office 3,102,190
Patented Aug. 27, 1963

3,102,190
METHOD OF WELDING GALVANIZED STEEL
André Chapleur and Bernard Schoeps, both of Strasbourg, Bas-Rhin, France, assignors to Forges de Strasbourg, Paris, France, a company of France
No Drawing. Filed May 22, 1961, Ser. No. 111,481
Claims priority, application France July 12, 1960
7 Claims. (Cl. 219—117)

This invention relates to the electrical welding of galvanized, i.e. zinc-coated or -plated steels, especially the welding of galvanized steel sheet.

Considerable difficulties have been encountered heretofore in connection with the electric welding of galvanized steel. These difficulties are due in part to the formation of copper-zinc alloys between the zinc plating and the copper of the welding electrode, resulting in a tendency for the electrode to stick or seize to the work, and in a rapid deterioration of the electrode surface. Moreover, various oxides of zinc and copper form at the contact surfaces of the welding electrodes, affecting the quality of the weld. Zinc oxide is especially objectionable because of its poor electrical conductivity causing an intolerable drop in welding current. The formation of the oxides results in the necessity of cleaning and re-machining the electrodes at frequent intervals.

While a method of arc welding applicable to galvanized steel has been proposed, in many cases resistance welding is more desirable, especially in the case of galvanized steel sheets, and no practical method of resistance-welding galvanized steel has so far been developed to the applicant's knowledge in view of the above enumerated and related difficulties. This practical impossibility of electrically welding galvanized steel, especially galvanized steel sheet, has imposed a serious restriction on the uses of this otherwise highly useful material. It is an object of this invention to eliminate this limitation and to provide a workable and efficient method of electrically welding galvanized steel in all of its forms including sheet form. Another object is to provide a method of welding galvanized steel, both by spot welding and continuous welded seams, that will be convenient to use in shop and field conditions and will uniformly produce an excellent welded joint while retaining a long service life for the welding electrodes.

The applicants have discovered that the difficulties heretofore attendant on the electric especially resistance, welding of galvanized steels can be greatly reduced or completely eliminated if the surface of the work is first coated, prior to the welding process, with a coating of a substance having high electrical conductivity (e.g. copper) while completely preventing any direct contact between the welding electrode and the galvanized steel work surface. The coating need not be, and preferably is not, a continuous one, in the sense that it may, and preferably does, comprise a layer of particles of the electrically conductive material, such as copper. The coating should, however, be sufficiently firmly bonded to the underlying surface of galvanized steel to ensure that substantially no direct contact between the electrode and work surface shall occur.

In a preferred form of embodiment of the invention, the coating is applied as a dispersion of powder copper (or other conductive metal) in a quick-drying adhesive composition. The adhesive composition may comprise a macromolecular compound of natural of synthetic character, diluted or dissolved in a volatile organic liquid, one useful specific form of the composition comprises a cellulose compound dispersed in an organic solvent, e.g. collodion in acetone. The dispersion may be applied in any convenient way, as by brush-coating, spraying, or otherwise.

After application of the dispersion to the work surface, it is allowed to dry, whereupon a relatively thin, adherent coat of copper bonded to the work surface is formed. The welding process can then immediately be performed in the usual way. It is found that no objectionable oxide or other deposits are formed. The electrodes do not tend to cling to the work and do not wear out or sustain any other damage except at the usual rate occurring in the welding of steel. Because the formation of zinc oxide by reaction with atmospheric oxygen is greatly reduced owing to the presence of the intervening copper layer, objectionable oxidation along the margins of the welded seam is practically completely prevented. It is found that, owing to the pulverulent nature of the copper coating, the copper-zinc alloy formed between the copper coating and the zinc of the work surface does not adhere to the welded surface area. Thus, on completion of the weld, it is simply necessary to wipe the welded surface as with a cloth or brush in order to strip the surface of any foreign material present thereon and obtain a clean weld. The invention makes it possible, among other conventional electric welding techniques, to use welding rollers or wheels, a procedure which could not practically be applied heretofore to galvanized steel sheet.

It will be understood that the method of the invention is susceptible of a wide variety of modifications in its practical embodiments. The conductive substance may be other than copper and it may be applied otherwise than in the specific forms mentioned.

What we claim is:
1. In a process of electrically welding galvanized steel the step of first bonding to the work surface an adherent layer of pulverulent high-conductivity metal and then passing an electric welding electrode in contact with said layer to weld the work.
2. In a process of electrically welding galvanized steel the step of applying to the work surface highly-conductive powder metal dispersed in a quick-drying liquid adhesive composition, allowing the composition to dry, thereby providing an adherent conductive metal coating on the work surface, and applying an electric welding electrode to the coated surface.
3. The process of claim 2, wherein said metal is copper.
4. The process of claim 2, wherein said adhesive composition comprises a macromolecular organic compound in a volatile organic solvent.
5. The process of claim 2, wherein said adhesive composition comprises a cellulose compound in an organic solvent.
6. The process of claim 2, wherein said adhesive composition comprises collodion dispersed in acetone.
7. The process of claim 2, further comprising the step of wiping away any residual parts of said coating from the welded work.

References Cited in the file of this patent
UNITED STATES PATENTS

| | | |
|---|---|---|
| 1,267,400 | Gravell | May 28, 1918 |
| 1,308,778 | Gravell | July 8, 1919 |
| 1,414,822 | Ledwinka | May 2, 1922 |
| 2,452,805 | Sussenbach | Nov. 2, 1948 |
| 2,510,727 | Sussenbach | June 6, 1950 |
| 2,898,253 | Schneider | Aug. 4, 1959 |